United States Patent
Mills et al.

(10) Patent No.: US 6,921,107 B2
(45) Date of Patent: Jul. 26, 2005

(54) APPARATUS FOR SENSING VEHICLE SEAT POSITION

(75) Inventors: Aaron M. Mills, Dexter, MI (US); David L. Becker, White Lake, MI (US)

(73) Assignee: TRW Inc., Lyndhurst, OH (US)

( * ) Notice: Subject to any disclaimer, the term of this patent is extended or adjusted under 35 U.S.C. 154(b) by 121 days.

(21) Appl. No.: 10/316,770

(22) Filed: Dec. 11, 2002

(65) Prior Publication Data

US 2004/0113403 A1 Jun. 17, 2004

(51) Int. Cl.⁷ .................. B60R 21/32; H01L 43/06
(52) U.S. Cl. ...................... 280/735; 324/207.2
(58) Field of Search .................. 280/735; 701/45; 324/207.24, 207.2

(56) References Cited

U.S. PATENT DOCUMENTS

| | | | |
|---|---|---|---|
| 3,022,976 A | 2/1962 | Zia | |
| 4,665,362 A | 5/1987 | Abel et al. | |
| 4,909,560 A | 3/1990 | Ginn | |
| 5,074,583 A | 12/1991 | Fujita et al. | |
| 5,232,243 A | 8/1993 | Blackburn et al. | |
| 5,542,493 A | 8/1996 | Jacobson et al. | |
| 5,608,317 A | 3/1997 | Hollmann | |
| 5,626,359 A | 5/1997 | Steffens, Jr. et al. | |
| 5,670,876 A | 9/1997 | Dilger et al. | |
| 5,803,491 A | 9/1998 | Barnes et al. | |
| 5,967,549 A | 10/1999 | Allen et al. | |
| 6,039,344 A | 3/2000 | Mehney et al. | |
| 6,053,529 A | 4/2000 | Frusti et al. | |
| 6,095,555 A | 8/2000 | Becker et al. | |
| 6,113,139 A | 9/2000 | Heximer et al. | |
| 6,170,865 B1 | 1/2001 | Barron | |
| 6,170,866 B1 | 1/2001 | Popp et al. | |
| 6,215,299 B1 * | 4/2001 | Reynolds et al. | 324/207.2 |
| 6,304,078 B1 * | 10/2001 | Jarrard et al. | 324/207.2 |
| 6,341,252 B1 | 1/2002 | Foo et al. | |
| 6,351,994 B1 | 3/2002 | Pinkos et al. | |
| 6,369,689 B1 | 4/2002 | Osmer et al. | |
| 6,690,159 B2 * | 2/2004 | Burreson et al. | 324/207.23 |
| 2002/0015606 A1 * | 2/2002 | Bradfield | 400/55 |
| 2004/0155647 A1 * | 8/2004 | Green et al. | 324/207.2 |

FOREIGN PATENT DOCUMENTS

EP          584426 A  *  3/1994  ............. G01D/5/14

OTHER PUBLICATIONS

Research Disclosure, Jul., 1993 pp. 450–451.
Co–pending U.S. Appl. No. 09/863,858, filed May 23, 2001 entitled "Vehicle Seat Position Sensing Apparatus".

* cited by examiner

Primary Examiner—Paul N. Dickson
Assistant Examiner—Joselynn Y. Sliteris
(74) Attorney, Agent, or Firm—Tarolli, Sundheim, Covell & Tummino L.L.P.

(57) ABSTRACT

An apparatus (10) for sensing the position of a vehicle seat (12) movable between a forward position and a rearward position includes a Hall effect device (80) and a magnet (82) that produces a magnetic field that acts on the Hall effect device. A member (100) is constructed of a ferromagnetic material and has a portion (110) positioned adjacent the magnet (82). The portion (110) has a size that is unique for every different position of the vehicle seat (12) between the forward and rearward positions. The portion (110) of the member (100) alters the flux path of the magnetic field which varies the portion of the magnetic field acting on the Hall effect device (80) to a degree that depends on the size of the portion. The Hall effect device (80) provides a signal functionally related to the magnitude of the magnetic field acting on the Hall effect device.

19 Claims, 4 Drawing Sheets

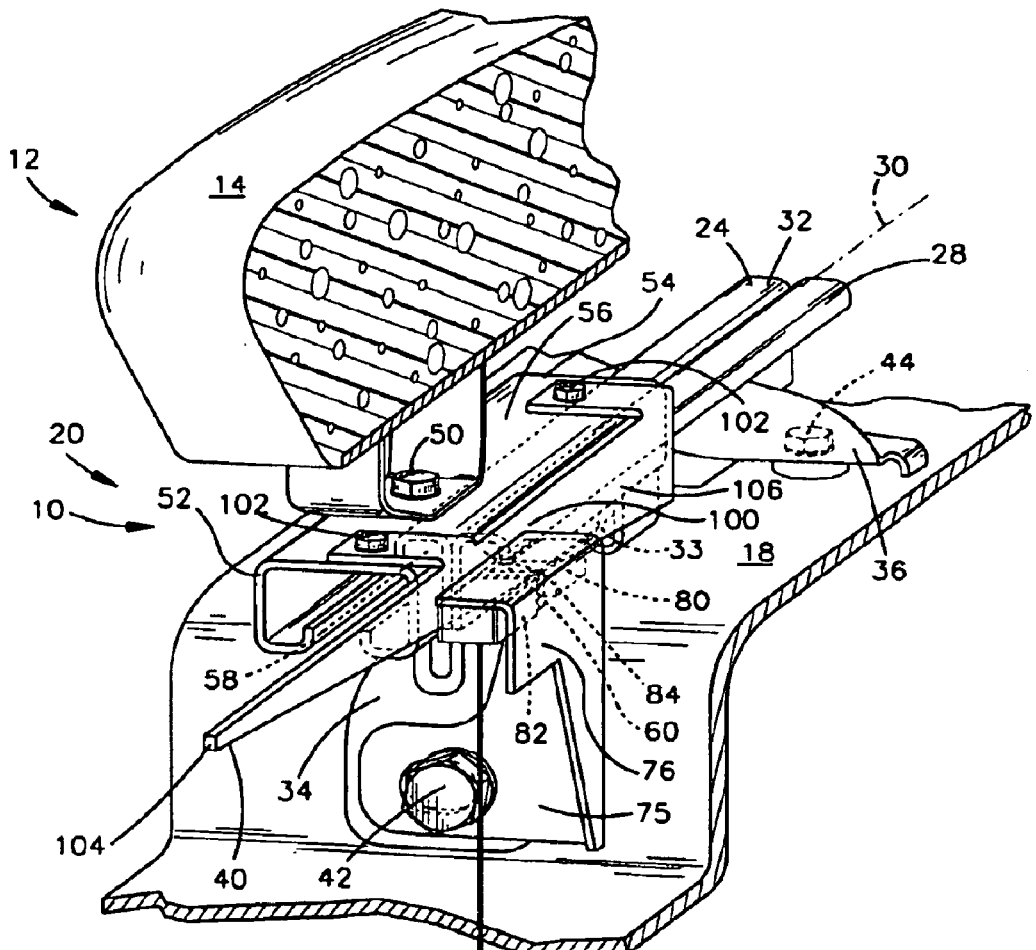
Fig.3
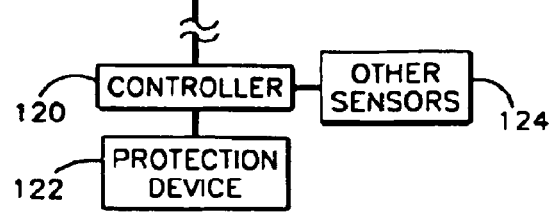

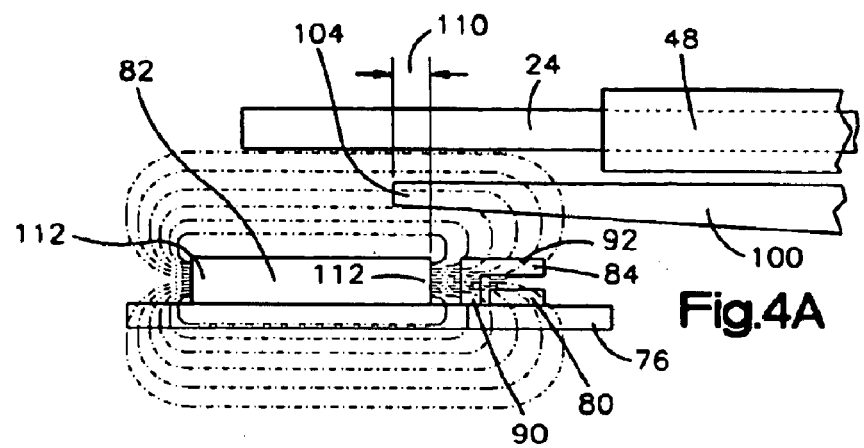
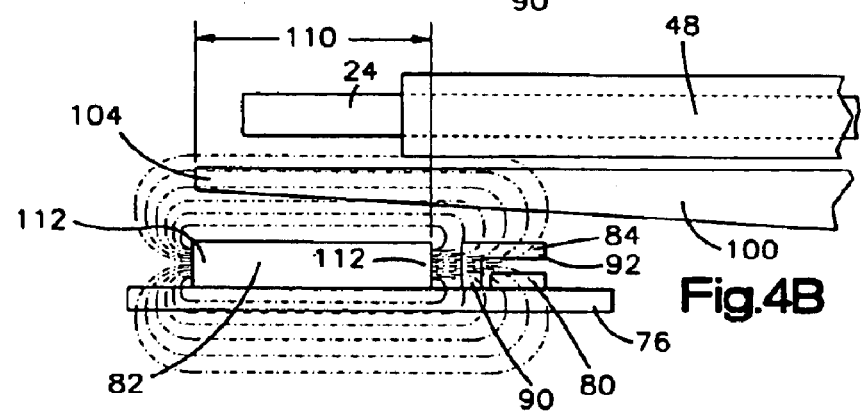
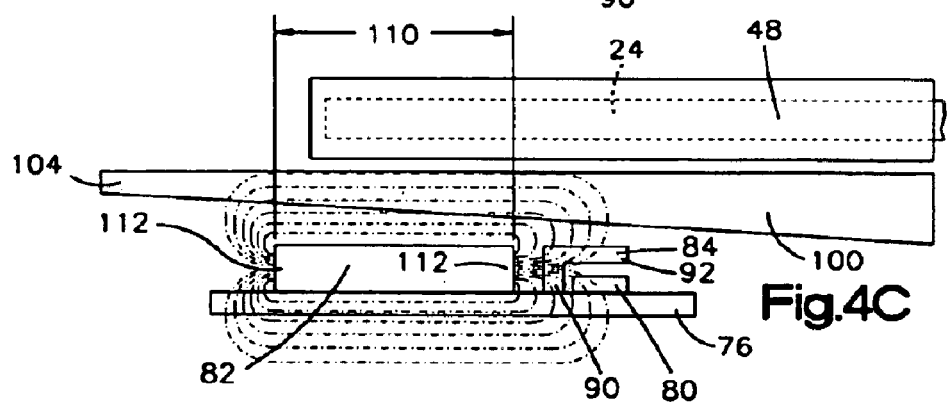
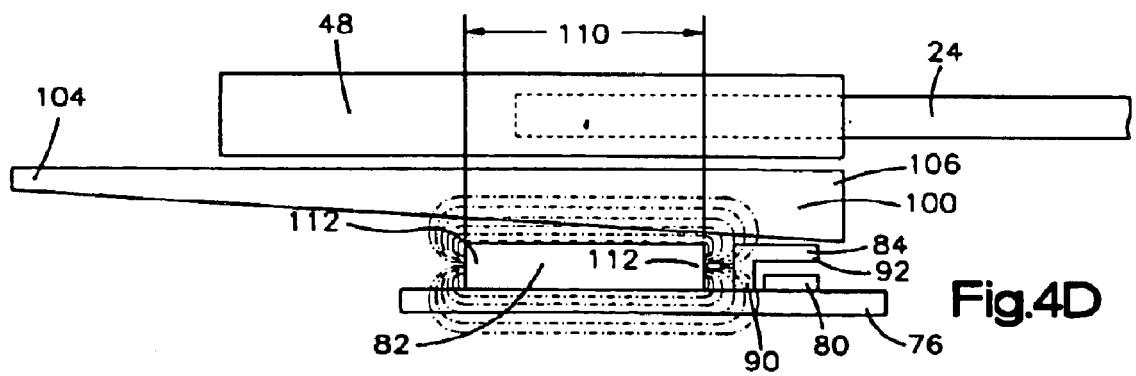

APPARATUS FOR SENSING VEHICLE SEAT POSITION

TECHNICAL FIELD

The present invention relates to an apparatus for sensing the position of a seat in a vehicle.

BACKGROUND OF THE INVENTION

It may be desirable to alter or prevent the actuation of a vehicle occupant protection device, such as an air bag, depending on the position of the occupant relative to the protection device. To this point, numerous systems have been developed to detect the position of a vehicle occupant relative to the protection device. Known systems utilize ultrasonic sensors, infrared sensors, microwave sensors or a combination of various sensing devices to detect the position of a vehicle occupant. Other known systems determine the position of a vehicle occupant by detecting the position of the vehicle seat in which the occupant is seated. Such known systems utilize a variety of sensing devices, such as limit switches and potentiometers, to sense the seat position.

SUMMARY OF THE INVENTION

The present invention relates to an apparatus for sensing the position of a vehicle seat movable between a forward position and a rearward position. The apparatus comprises a Hall effect device, a magnet, and a member. The magnet produces a magnetic field that acts on the Hall effect device. The member is constructed of a ferromagnetic material and has a portion positioned adjacent the magnet. The portion of the member positioned adjacent the magnet has a size that is unique for every different position of the vehicle seat between the forward and rearward positions. The portion of the member alters the flux path of the magnetic field which varies the portion of the magnetic field acting on the Hall effect device. The degree to which the portion alters the flux path depends on the size of the portion. The Hall effect device provides a signal functionally related to the magnitude of the magnetic field acting on the Hall effect device.

The present invention also relates to an apparatus comprising an inflatable vehicle occupant protection device inflatable between a vehicle occupant and a part of the vehicle and a controller for actuating the protection device based at least in part as a function of a signal indicative of a sensed vehicle seat position. The apparatus also includes a sensor for providing the signal indicative of the sensed vehicle seat position to the controller. The sensor comprises a Hall effect device, a magnet producing a magnetic field that acts on the Hall effect device, and a member constructed of a ferromagnetic material and having a tapered width. The member is movable with the vehicle seat along a path extending adjacent the magnet. The member has a portion positioned adjacent said magnet that attracts a portion of the magnetic field away from the Hall effect device. The portion of the member positioned adjacent the magnet having a size that varies depending on the position of the vehicle seat. The portion of the magnetic field attracted by the portion varies in proportion to the size of the portion of the member positioned adjacent the magnet. The Hall effect device provides the signal indicative of sensed vehicle seat position to the controller, the signal being functionally related to the magnitude of the magnetic field acting on the Hall effect device.

The present invention also relates to an apparatus for sensing the position of a vehicle seat movable between a forward position and a rearward position. The apparatus comprises a Hall effect device, a magnet producing a magnetic field that acts on the Hall effect device, and a tapered member movable with the vehicle seat. The member attracts a portion of the magnetic field away from the Hall effect device. The portion of the magnetic field is proportional to the size of a portion of the member positioned adjacent the magnet. The Hall effect device is operative to provide a signal functionally related to the magnitude of the magnetic field acting on the Hall effect device.

The present invention further relates to an apparatus for sensing the position of a vehicle seat movable between a forward position and a rearward position. The apparatus comprises a Hall effect device, a magnet producing a magnetic field that acts on the Hall effect device, and a tapered member movable with the vehicle seat. The member has a portion positioned adjacent the magnet that has a unique size associated with each vehicle seat position. The portion of the member positioned adjacent the magnet attracting a portion of the magnetic field away from the Hall effect device. The portion is proportional to the size of the portion of the member positioned adjacent the magnet. The Hall effect device is operative to provide a signal functionally related to the magnitude of the magnetic field acting on the Hall effect device.

BRIEF DESCRIPTION OF THE DRAWINGS

The foregoing and other features of the invention will become more apparent to one skilled in the art upon consideration of the following description of the invention and the accompanying drawings in which:

FIG. 3 is an enlarged perspective view of a portion of the apparatus of FIG. 1, illustrating a forward position of the vehicle seat; and FIGS. 4A–4D are schematic views illustrating a portion of the apparatus of FIG. 1 in different positions.

DESCRIPTION OF A PREFERRED EMBODIMENT

Figure 1:
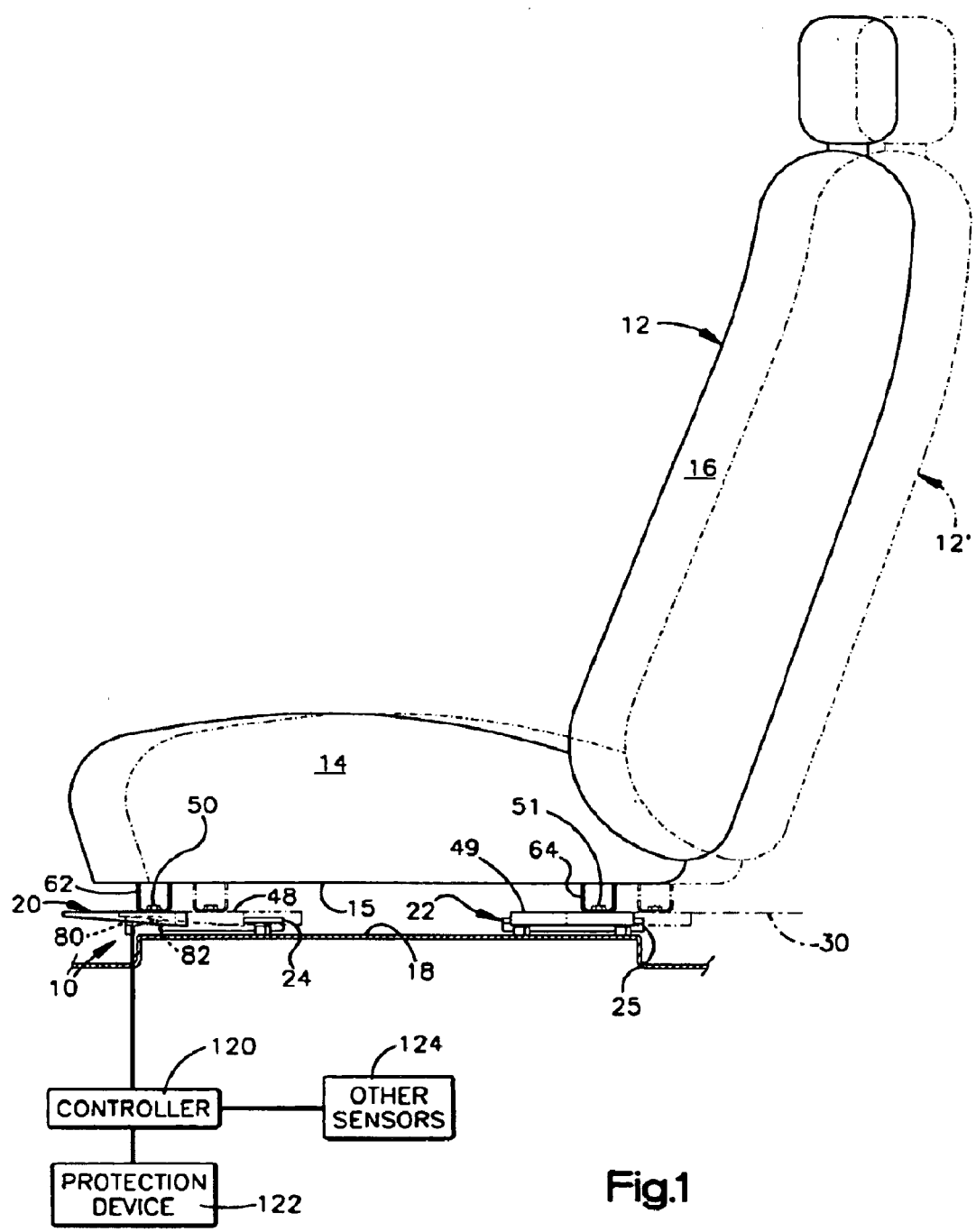
FIG. 1 is a schematic representation of a side elevation of an apparatus for sensing vehicle seat vehicle in accordance with a preferred embodiment of the present invention.

FIG. 1 illustrates an apparatus 10 for sensing the position of a vehicle seat 12. The seat 12 includes a seat cushion portion 14 and a seat back portion 16 extending upwardly from the seat cushion portion 14. The seat 12 is located within a vehicle occupant compartment and is adjustably (movably) mounted to a lower body portion 18 of a vehicle. The seat 12 is illustrated in solid lines in a forward position, and in dotted lines in a rearward position designated at 12'.

The particular manner in which the seat 12 is moved forward and rearward is not critical to the present invention. The seat may be moved forwardly and rearwardly, for example, by actuating an appropriate electric motor (not shown) operatively coupled to the seat 12 or by manual adjustment after releasing a seat latch by movement of a known mechanical release lever (not shown).

Forward and rearward movement of the vehicle seat 12 is guided by guide tracks, indicated at 20 and 22. While FIG. 1 illustrates a pair of such guide tracks 20 and 22, it will be appreciated that typically there are four such guide tracks near the corner portions of a lower surface 15 of the seat cushion portion 14.

Each guide track 20 and 22 includes a seat bracket, indicated at 24 and 25, respectively, mounted to the lower body portion 18 of the vehicle. The seat brackets 24 and 25 are formed of a suitable rigid material such as steel.

Figure 2:
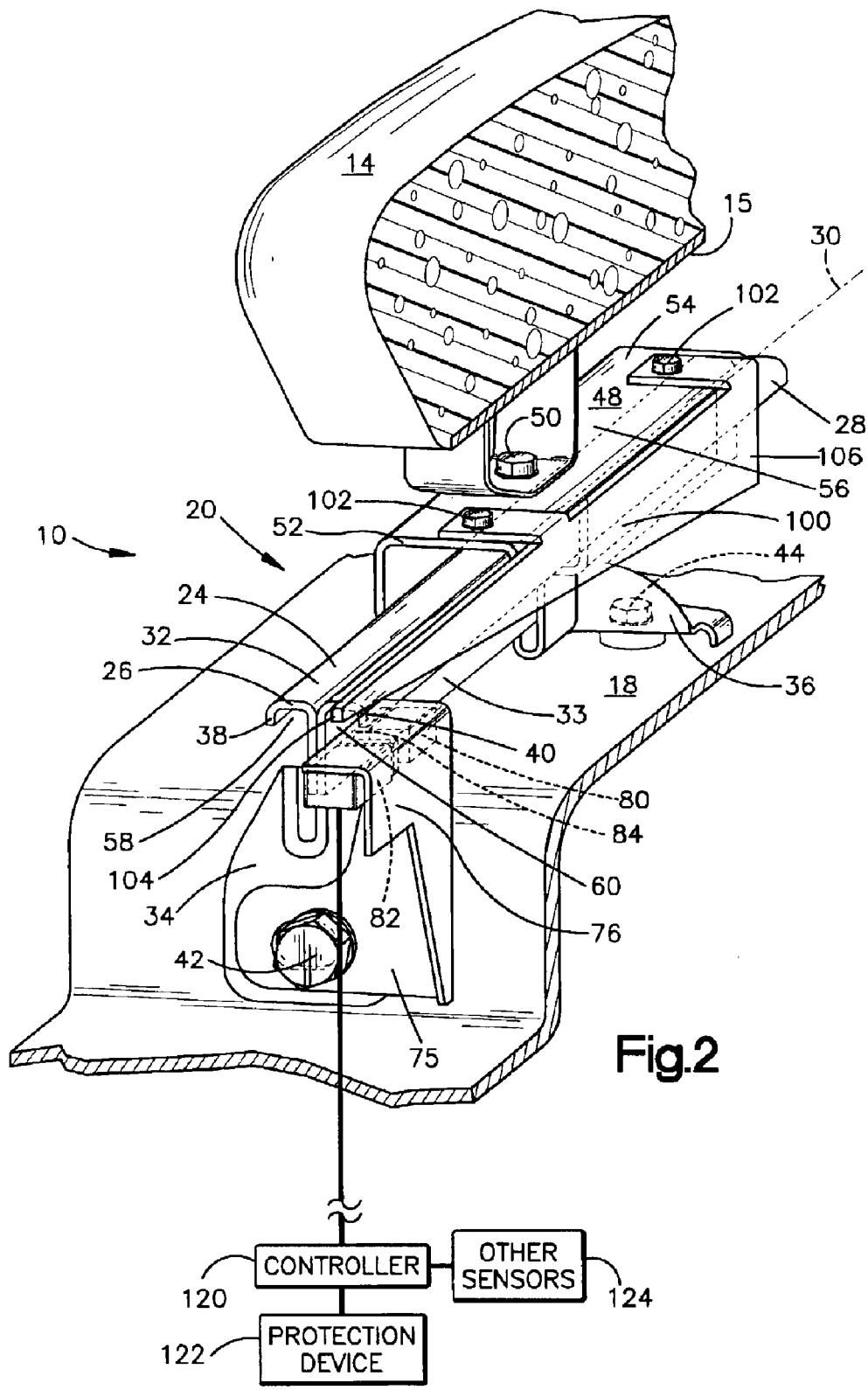
FIG. 2 is an enlarged perspective view of a portion of the apparatus of FIG. 1, illustrating a rearward position of the vehicle seat.

Referring to FIGS. 2 and 3, the seat bracket 24 of guide track 20 comprises an elongated T-shaped guide member 32 connected to the lower body portion 18. The guide member 32 includes first and second spaced apart end portions 26 and 28. A longitudinal bracket axis 30 extends through the end portions 26 and 28 of the guide member 32. A vertical base portion 33 of the T-shaped guide member 32 is supported by a pair of spaced apart bracket members 34 and 36. The bracket members 34 and 36 are secured to the lower vehicle body portion 18 by fasteners, illustrated at 42 and 44. The T-shaped member 32 includes laterally extending opposed flanged portions 38 and 40. The flanged portions 38 and 40 extend outwardly transverse to the vertical base portion 33 and curve downwardly towards the lower body portion 18. The flanged portions 38 and 40 form a pair of adjacent, longitudinal channels which extend parallel to the bracket axis 30.

The seat bracket 25 is substantially identical to the seat bracket 24 described above. Alternatively, a single elongated seat bracket (not shown) could be used instead of the pair of the coaxial seat brackets 24 and 25 shown in FIG. 1.

Referring to FIG. 1, the guide tracks 20 and 22 also include respective elongated seat rail members 48 and 49 that are mounted to the lower surface 15 of the seat cushion portion 14 by respective fasteners 50 and 51. Each seat rail member 48 and 49 is supported by a respective one of the seat brackets 24 and 25. Each rail member 48 and 49 is movable relative to its respective one of the seat brackets 24 and 25 in a direction generally parallel to the bracket axis 30. Thus, the guide tracks 20 and 22 support the seat 12 and allow for forward and rearward movement of the seat 12 in the vehicle.

As shown in FIGS. 2 and 3, the seat rail member 48 has first and second spaced apart end portions 52 and 54, with an elongated body portion 56 extending between the end portions 52 and 54. The body portion 56 has a generally rectangular outer surface and elongated side wall portions. A pair of opposed upturned flange portions extend longitudinally along a lower side wall portion of the body portion 56 to define substantially parallel elongated channel portions 58 and 60. The channel portions 58 and 60 receive and slidably engage the respective flanged portions 38 and 40 of the T-shaped guide member 32, which supports the seat 12 for longitudinal movement generally parallel to the bracket axis 30. Appropriate bearings (not shown) also may be used to support the seat and facilitate the longitudinal movement of the seat rail member 48 relative to the seat bracket 24.

The seat rail member 49 is substantially identical to the rail member 48 described above. Alternatively, a single elongated rail member (not shown) could be used instead of the two spaced apart rail members 48 and 49 shown in FIG. 1.

As shown in FIG. 1, the seat cushion portion 14 is mounted to and spaced apart from the seat rail member 48 and 49 by respective frame members 62 and 64. The frame members 62 and 64 extend downwardly from the lower surface 15 of the seat cushion portion 14. The frame members 62 and 64 are secured to the upper surface of the rail members 48 and 49 by the fasteners 50 and 51, respectively.

While a preferred embodiment of the guide tracks 20 and 22 has been described, it will be understood and appreciated by those skilled in the art that the apparatus of the present invention may be used with any known type of guide track.

Referring to FIGS. 2 and 3, the bracket member includes a support structure 75. The support structure 75 is attached to the bracket member 34 by the fastener 42. The support structure 75 includes an L-shaped support member 76 that extends from the bracket member 34 in a direction generally parallel to the bracket axis 30. The support structure 75 is positioned adjacent the end portion 26 of the guide member 32. A portion of the support member 76 extends beyond the axial extent of the first end portion 26 of the guide member 32.

The apparatus 10 includes a Hall effect device 80 and a magnet 82. In the illustrated embodiment, the magnet 82 is a permanent magnet. The magnet 82 could, however, be an electromagnet. The Hall effect device 80 is mounted to the support structure 75 portion of the seat bracket 24 on an inside corner of the L-shaped support member 76. The magnet 82 is mounted to the support member 76 next to the Hall effect device 80. The Hall effect device 80 and the magnet 82 may be affixed to the support member 76 in any suitable manner such as by a suitable adhesive. The Hall effect device 80 and the magnet 82 are positioned such that the Hall effect device 80 is within the magnetic field of the magnet 82.

The apparatus 10 may also include a flux collector 84. The flux collector 84 is constructed of a ferromagnetic material and is mounted to the support member 76 between the magnet 82 and the Hall effect device 80. The flux collector 84 may be affixed to the support member 76 in any suitable manner such as by a suitable adhesive or by forming the flux collector as a single piece with the support member. In the illustrated embodiment, the flux collector has a generally L-shaped configuration with a first leg 90 extending between the Hall effect device 80 and the magnet 82 and a second leg 92 extending perpendicularly from the first leg and spaced from and along the Hall effect device.

The apparatus 10 also includes a member in the form of a target 100 for collecting magnetic flux from the magnet 82. The target 100 is connected to the rail member 48 by suitable means, such as bolts 102. The target 100 is thus movable with the seat 12 in a direction parallel to the axis 30 from the rearward position of FIG. 2 to the forward position of FIG. 3.

The target 100 is positioned between the rail member 48 and the assemblage of the Hall effect device 80, magnet 82, flux collector 84, and support member 76. A portion of the target 100 is positioned adjacent the magnet 82. The portion of the target 100 positioned adjacent the magnet 82 varies depending on the position of the seat 12 between its forward and rearward position.

The target 100 has a generally tapered configuration wherein the width of the target tapers from a narrowed first end 104 to a widened second end 106. Because of this, the portion of the target 100 positioned adjacent the magnet 82 has a size that varies depending on the position of the seat 12 between its forward and rearward position. "Size" of the portion of the target 100 is used herein to refer to the mass or volume of the ferromagnetic material of the target. "Positioned adjacent the magnet 82" is used herein to refer to the portion of the target 100 extending along the length of the magnet 82. This is best illustrated in FIGS. 4A–4D.

FIGS. 4A–4D illustrate schematically the position of the target 100 relative to the Hall effect device 80, magnet 82, and flux collector 84 as the seat (not shown) travels from the rearward position (FIG. 4A) to the forward position (FIG. 4D). Thus, FIG. 4A corresponds to FIG. 2 and FIG. 4D corresponds to FIG. 3. FIGS. 4B and 4C illustrate the position of the target 100 relative to the Hall effect device 80, magnet 82, and flux collector 84 at seat positions between the rearward and forward positions. It should be noted that, in FIGS. 4A–4D, the target 100 has been rotated ninety degrees from its actual configuration (see FIGS. 1–3) in order to show its tapered configuration.

The portion of the target 100 positioned adjacent the magnet 82 is illustrated at 110 in FIGS. 4A–4D. Also, in FIGS. 4A–4D, magnetic flux lines are used to illustrate the flux path of the magnetic field generated by the magnet 82. For simplicity, the flux lines are shown schematically as extending in a generally uniform manner between poles 112 of the magnet 82. Those skilled in the art, however, will appreciate that the actual flux path may vary, in which case the flux lines produced by the magnet 82 may vary and extend in a non-uniform manner. This may depend on factors such as whether other ferromagnetic components of the vehicle and/or seat are positioned in close proximity with the magnet 82.

The target 100, being constructed of a ferromagnetic material, attracts the magnetic field produced by the magnet 82, which alters the flux path of the magnetic field. The degree to which the target 100 attracts the magnetic field and alters the flux path depends at least partially on the size, i.e., the mass or volume, of the portion 110 positioned adjacent the magnet 82. Since the target 100 has a tapered configuration, the size of the portion 110 positioned adjacent the magnet 82 is different or unique for every different position of the vehicle seat 12 between the forward and rearward position.

Also, as shown in FIGS. 4A–4D, the flux collector 84, being constructed of a ferromagnetic material, attracts the magnetic field produced by the magnet 82, thus altering the flux path to extend through the Hall effect device 80. This is illustrated by the flux lines in FIGS. 4A–4D being drawn to the right, as viewed in the Figures, through the flux collector 84 and the Hall effect device 80.

Referring to FIG. 4A, when the seat is in the rearward position, the portion 110 of the target 100 positioned adjacent the magnet 82 includes only a small portion near the first end 104 of the target. The size of the portion 110 positioned adjacent the magnet 82 is thus relatively small. The target 100 thus attracts a relatively small amount of the magnetic field produced by the magnet 82, which results in a relatively small alteration of the flux path. The magnetic field of the magnet 82, acting on the Hall effect device 80, has a relatively high magnitude. Thus, when the target 100 is in the position illustrated in FIG. 4A, a magnetic field having a relatively high flux density acts on the Hall effect device 80.

Referring to FIGS. 4B and 4C, as the seat moves from the rearward position toward the forward position, the portion 110 of the target 100 positioned adjacent the magnet 82 becomes increasingly large. The target 100 thus attracts an increasingly larger amount of the magnetic field produced by the magnet 82, which results in an increasingly large alteration of the flux path. As the magnetic field attracted by the portion 110 becomes increasingly large, the magnetic field acting on the Hall effect device 80 has a decreasing magnitude. Thus, as the target 100 moves to the positions illustrated in FIGS. 4B and 4C, a magnetic field having a decreasing flux density acts on the Hall effect device 80.

Referring to FIG. 4D, when the seat is in the forward position, the portion 110 of the target 100 positioned adjacent the magnet 82 includes a portion toward the widened second end 106 of the target. The size of the portion 110 positioned adjacent the magnet 82 is thus relatively large. The target 100 thus attracts a relatively large amount of the magnetic field produced by the magnet 82, which results in a relatively large alteration of the flux path. The magnetic field of the magnet 82 acting on the Hall effect device 80 has a relatively low magnitude. Thus, when the target 100 is in the position illustrated in FIG. 4D, a magnetic field having a relatively low flux density acts on the Hall effect device 80. In fact, when the apparatus 10 is in the position illustrated in FIG. 4D, the flux path may be altered such that little or even none of the magnetic field produced by the magnet 82 may act on the Hall effect device 80.

The Hall effect device 80 of the present invention is a ratiometric Hall effect device. This ratiometric Hall effect device 80 has an output signal that varies as a function of the flux density of the magnetic field acting on the Hall effect device. The output signal of the Hall effect device 80 may be implemented in a circuit that is configured such that the current or voltage of the output signal varies as a function of the flux density of the magnetic field acting on the Hall effect device.

Referring back to FIG. 2, it will be appreciated that, when the vehicle seat 12 is in the rearward position, the flux density of the magnetic field acting on the Hall effect device 80 is relatively high. As a result, in the illustrated embodiment, the output signal of the Hall effect device 80 would have an associated magnitude (i.e., a high current or voltage) when the vehicle seat 12 is in the rearward position.

As the vehicle seat 12 is adjusted toward the forward position of FIG. 3, the flux density of the magnetic field acting on the Hall effect device 80 is reduced by the target 100 in the manner described herein above in reference to FIGS. 4A–4D. The magnitude (i.e., current/voltage) of the output signal from the Hall effect device 80 is thus varied (i.e., reduced) by an amount proportional to the distance the vehicle seat 12 moves. This proportional reduction of the output signal continues until the vehicle seat reaches the forward position of FIG. 3. At this point, the flux density of the magnetic field acting on the Hall effect device 80 is relatively low. As a result, the output signal of the Hall effect device 80 would have an associated magnitude (i.e., a low current or voltage) when the vehicle seat 12 is in the forward position.

The information provided by the apparatus 10 can be used to control the operation of a vehicle occupant protection device. Depicted schematically in FIGS. 1–3, the output signal from the Hall effect device 80 is directed to a controller 120. The controller 120 may comprise a microcomputer, an integrated circuit, a plurality of discrete components or a combination of integrated circuits and discrete components configured to provide desired functions.

The controller 120 is electrically coupled to an actuatable vehicle occupant protection device 122 for, when actuated, helping to protect a vehicle occupant upon the occurrence of an event for which occupant protection is desired. The protection device 122 may, for example, be an air bag, such as for a driver or front passenger of the vehicle. Other examples of actuatable vehicle occupant protection devices that can be used in accordance with the present invention include side curtains, side impact air bags, inflatable knee bolsters, and knee bolsters operated by inflatable air bags. The controller 120 also is coupled to other sensors, schematically indicated at 124. The other sensors 124 may include, for example, a crash sensor, a seat belt buckle switch sensor, a vehicle speed sensor, an occupant weight sensor or any other sensing device or combination of devices which provide useful information concerning actuation of the protection device 122. The other sensors 124 provide signals to the controller 120 indicative of one or more vehicle and/or occupant conditions.

The controller 120 utilizes the output signal from Hall effect device 80 to control the actuation of the protection device 122. For example, where the output signal of the Hall effect device 80 indicates that the seat 12 is at or forward of a predetermined forward position, the controller 120 may control actuation of the occupant protection device 122 so that its inflation is somewhat delayed. Under appropriate circumstances, the output signal of the Hall effect device 80 also might be used by the controller 120, in combination with the signals from the other sensors 124, to delay or even prevent actuation of the protection device 122.

Those skilled in the art will appreciate that the configuration of the apparatus may depart from that disclosed in the illustrated embodiment without departing from the spirit of the present invention. For example, in the illustrated embodiment, the apparatus 10 is configured such that the target 100 reduces the flux density of the magnetic field acting on the Hall effect device 80 as the seat 12 moves from the rearward position toward the forward position. The apparatus 10 could, however, be configured such that the flux density of the magnetic field acting on the Hall effect device 80 increase as the seat 12 moves from the rearward position to the forward position. In this instance, the Hall effect device 80 would provide an output signal, that increases as the seat moves from the rearward position toward the forward position.

As another example, in the illustrated embodiment, the Hall effect device 80 and the magnet 82 have a fixed position on the vehicle. The target 100 is movable with the seat 12 relative to the Hall effect device 80 and the magnet 82. The present invention could, however, be configured such that the target 100 has a fixed position on the vehicle and the Hall effect device 80 and magnet 82 are movable with the seat 12 relative to the target.

As a further example, in the illustrated embodiment, the target 100 alters the flux path of the magnetic field to attracts the field away from the Hall effect device 80. The apparatus 10 could, however, be configured such that the target 100 alters the flux path of the magnetic field to attract the field toward the Hall effect device 80. In this instance, as the size of the portion 110 adjacent the magnet 82 increases, the flux density of the magnetic field acting on the Hall effect device 80 would increase.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for sensing the position of a vehicle seat movable between a forward position and a rearward position, said apparatus comprising:
   a Hall effect device;
   a magnet producing a magnetic field that acts on said Hall effect device, said magnetic field having a flux path; and
   a member constructed of a ferromagnetic material, said member having a portion positioned adjacent said magnet, said portion of said member positioned adjacent said magnet having a size that is unique for every different position of the vehicle seat between said forward and rearward positions; said portion of said member altering the flux path of said magnetic field which varies the portion of said magnetic field acting on said Hall effect device, the degree to which said portion alters said flux path depending on the size of said portion of said member positioned adjacent said magnet, said Hall effect device providing a signal functionally related to the magnitude of the magnetic field acting on said Hall effect device.

2. Apparatus as recited in claim 1, wherein said member is mountable to the vehicle seat and movable with the vehicle seat along an axis.

3. Apparatus as recited in claim 2, wherein said member has a length extending parallel to said axis and a width measured perpendicular to said length, said member having a tapered configuration wherein said width tapers from a second widened end of said member to a first shortened end of said member, said portion of said member positioned adjacent said magnet comprising a tapered portion of said member.

4. Apparatus as recited in claim 1, wherein the position of said member relative to said magnet and said Hall effect device varies as the vehicle seat moves between the forward and rearward positions, said portion of said member positioned adjacent said magnet varying as the position of said member relative to said magnet and said Hall effect device varies.

5. Apparatus as recited in claim 1, wherein said portion of said member attracts said magnetic field away from said Hall effect device, said magnetic field acting on said Hall effect device decreasing as the vehicle seat moves toward said forward position.

6. Apparatus as recited in claim 5, wherein said magnetic field acting on said Hall effect device has a flux density, said flux density acting on said Hall effect device decreasing by an amount proportional to the size of said portion of said member positioned adjacent said magnet.

7. Apparatus as recited in claim 6, wherein said signal provided by said Hall effect device has a magnitude functionally related to the flux density of the magnetic field acting on said Hall effect device.

8. Apparatus as recited in claim 1, wherein said Hall effect device comprises a ratiometric Hall effect device.

9. Apparatus as recited in claim 1, further comprising means for receiving said signal provided by said Hall effect device, said means being operative to associate the magnitude of said signal with a position of the vehicle seat.

10. Apparatus as defined in claim 9, further comprising an actuatable vehicle occupant protection device for, when actuated, helping to protect a vehicle occupant, said means for receiving said signal comprising a controller for controlling actuation of said vehicle occupant protection device in response to said signal from said Hall effect device.

11. Apparatus as defined in claim 1 further comprising:
   a bracket for supporting said magnet and said Hall effect device, said bracket being fixed to the vehicle; and
   an elongated seat rail mounted to said vehicle seat, said member being connected to said seat rail, said seat rail and said member being movable with said vehicle seat relative to said bracket.

12. Apparatus as recited in claim 1, further comprising a flux collector for helping to alter the flux path of said magnetic field to act on said Hall effect device.

13. Apparatus comprising:
   an inflatable vehicle occupant protection device inflatable between a vehicle occupant and a part of a vehicle;
   a controller for actuating said inflatable vehicle occupant protection device based at least in part as a function of a signal indicative of a sensed vehicle seat position; and a sensor for providing said signal indicative of said sensed vehicle seat position to said controller, said sensor comprising:

a Hall effect device;

a magnet producing a magnetic field that acts on said Hall effect device; and a member constructed of a ferromagnetic material and having a tapered width, said member being movable with the vehicle seat along a path extending adjacent said magnet, said member having a portion positioned adjacent said magnet that attracts a portion of said magnetic field away from said Hall effect device, said portion of said member positioned adjacent said magnet having a size that varies depending on the position of the vehicle seat, said portion of said magnetic field attracted by said portion of said member varying in proportion to the size of said portion of said member positioned adjacent said magnet;

said Hall effect device providing said signal indicative of said sensed vehicle seat position to said controller, said signal being functionally related to the magnitude of the magnetic field acting on said Hall effect device.

14. An apparatus for sensing the position of a vehicle seat movable between a forward position and a rearward position, said apparatus comprising:

a Hall effect device;

a magnet producing a magnetic field that acts on said Hall effect device; and a tapered member movable with the vehicle seat, said member attracting a portion of said magnetic field away from said Hall effect device, said portion of said magnetic field being proportional to the size of a portion of said member positioned adjacent said magnet, said Hall effect device being operative to provide a signal functionally related to the magnitude of the magnetic field acting on said Hall effect device.

15. An apparatus for sensing the position of a vehicle seat movable between a forward position and a rearward position, said apparatus comprising:

a Hall effect device;

a magnet producing a magnetic field that acts on said Hall effect device; and a tapered member movable with the vehicle seat, said member having a portion positioned adjacent said magnet, said portion of said member positioned adjacent said magnet having a unique size associated with each vehicle seat position, said portion of said member positioned adjacent said magnet attracting a portion of said magnetic field away from said Hall effect device, said portion being proportional to the size of said portion of said member positioned adjacent said magnet, said Hall effect device being operative to provide a signal functionally related to the magnitude of the magnetic field acting on said Hall effect device.

16. Apparatus as recited in claim 1 including an elongated, seat rail mounted to said vehicle seat, said member being connected to said seat rail and positioned between said seat rail and said magnet.

17. Apparatus as recited in claim 1 wherein said Hall effect device is located rearwardly from said magnet.

18. Apparatus as recited in claim 1, further comprising a flux collector for helping to alter the flux path of said magnetic field to act on said Hall effect device, said flux collector extending between said magnet and said Hall effect device.

19. Apparatus as recited in claim 18 wherein said flux collector further extends between said Hall effect device and said member.

\* \* \* \* \*